United States Patent [19]
Halmaghi et al.

[11] Patent Number: 5,230,631
[45] Date of Patent: Jul. 27, 1993

[54] EDUCATIONAL AMUSEMENT DEVICE AND JEWELRY ITEM

[76] Inventors: John Halmaghi; Victor Halmaghi, both of 1058 Eastover, Bloomfield, Mich. 48304

[21] Appl. No.: 741,341

[22] Filed: Aug. 7, 1991

[51] Int. Cl.⁵ .................................. G09B 27/00
[52] U.S. Cl. .............................. 434/284; 446/487; 63/3
[58] Field of Search .................. 273/158, 153 R; 434/277, 278, 279, 284, 289; 446/487; 63/5.1, 3, 9, 10

[56] References Cited

U.S. PATENT DOCUMENTS 5,114,377 5/1992 Cove Mercuri et al. ............ 446/487

Primary Examiner—Richard J. Apley
Assistant Examiner—Karen A. Jalberit
Attorney, Agent, or Firm—Milton S. Gerstein

[57] ABSTRACT

A pair of spaced-apart, parallel rings is provided, with each ring provided with a plurality of semicircular loop portions pivotally connected to the respective ring about its circumference. Each ring has two sets of a plurality of semicircular loops, a first outer set that is pivotal in a first direction away from the other ring, and a second inner set that is pivotally connected to the first set of loops of the other ring. The loops of each set are arranged in an overlapping manner, so that when one of the loops is rotated, all of the loops of that set are concurrently rotated. Since the inner sets of loops of the two rings are pivotally interconnected, rotation of any loop of either of the two second inner sets will concurrently rotate the other loops of the second inner sets. Rotation of these loops of the second inner sets is achieved by drawing closer the two rings or by pulling them apart. The two first outer sets of loops are free to rotate in either direction.

16 Claims, 4 Drawing Sheets

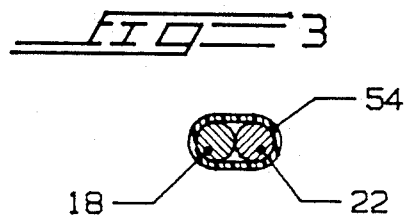
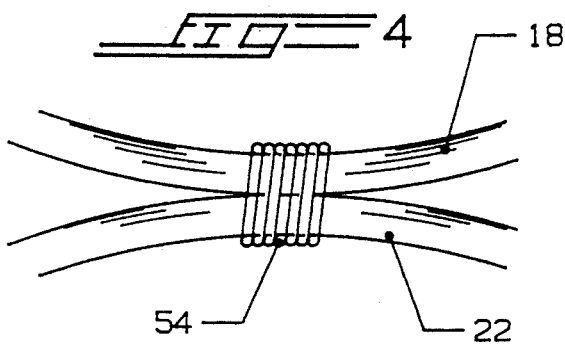
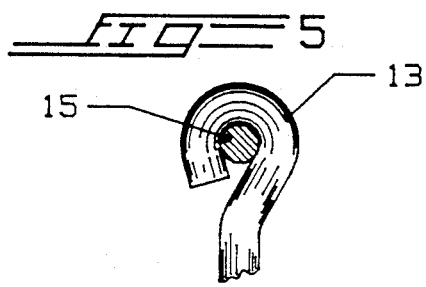
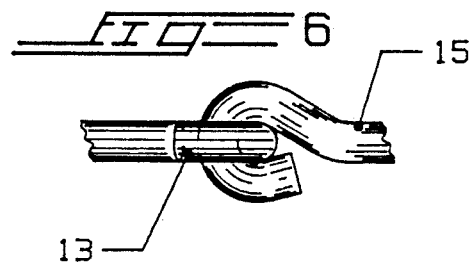
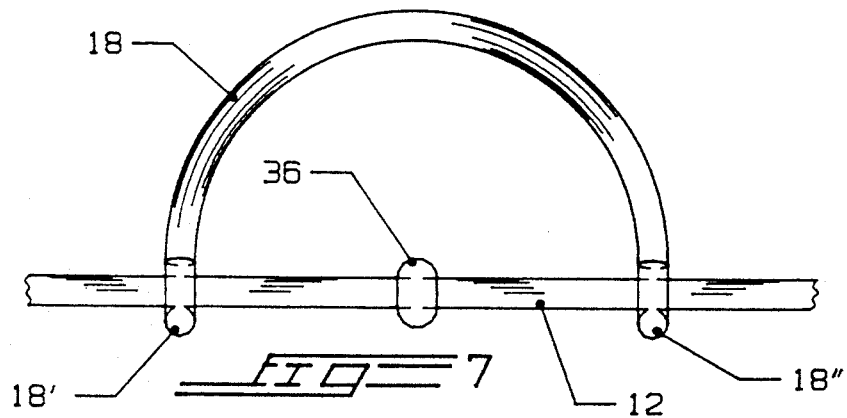
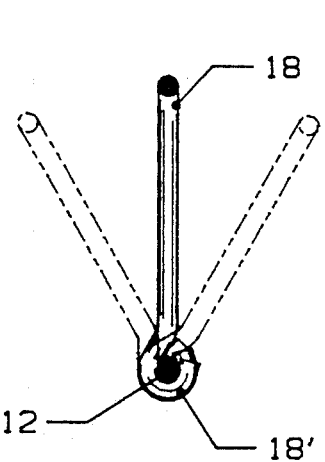
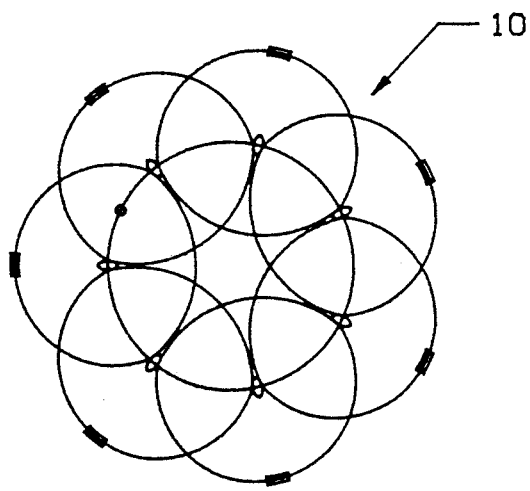

5,230,631

EDUCATIONAL AMUSEMENT DEVICE AND JEWELRY ITEM

BACKGROUND OF THE INVENTION

The present invention is directed to a device that may be used as an educational tool for showing the shapes of the planets, as well as being used as an amusement device. The invention also has applicability to jewelry, and may be used as a bracelet, and the like.

SUMMARY OF THE INVENTION

The present invention comprises a pair of spaced-apart, parallel rings. Each ring is provided with a plurality of semicircular loop portions pivotally connected at its ends to the respective ring. Each ring has two sets of a plurality of semicircular loops, a first outer set that is pivotal in a first direction away from the other ring, and a second inner set that is pivotally connected to the first set of loops of the other ring. The loops of each set are arranged in an overlapping manner, so that when one of the loops is rotated, all of the loops of that set are concurrently rotated. Since the inner sets of loops of the two rings are pivotally interconnected, rotation of any loop of either of the two second inner sets will concurrently rotate the other loops of the second inner sets. Rotation of these loops of the second inner sets is achieved by drawing closer the two rings or by pulling them apart. The two first outer sets of loops are free to rotate in either direction. The limits to rotation of the loops of the second outer sets are defined in the first, direction, away from the two rings, by the abutment of the loops against each other as they are rotated downwardly. In the second direction, toward the other ring, the limit to rotation is defined by the contact of the loops of the first set against the loops of the second inner set. Thus, rotation of the first outer set in the interior direction is dependent upon the rotational position of the second inner set, which, in turn, is directly dependent upon the spacing of the two rings relative to each other. By spacing the two rings a specific, desired distance apart, and rotating the two first outer sets a desired amount, a number of different configurations, or designs, may be achieved, which may be used to show the shape of various planets, or may be used simply as an amusement device. The device may also be used as a bracelet, which bracelet inherently is capable of exhibiting different designs, spacing the rings at different distances and by rotating the two first outer sets of loops to a desired orientation.

BRIEF DESCRIPTION OF THE DRAWINGS

The invention will be more readily understood with reference to the accompanying drawing, wherein:

FIG. 3 is a cross-sectional view taken along line 3—3 of FIG. 1 showing the coil-coupler that couples adjacent inner loops of the two rings;

FIG. 4 is a top plan view of the coil-coupler;

FIG. 5 is a cross-sectional view taken along line 5—5 of FIG. 1 showing the end-connections of a ring;

FIG. 6 is a plan view thereof;

FIG. 7 is a detail plan view of a semicircular loop and its pivotal, hooked end-connections to a portion of a ring;

FIG. 8 is a side view thereof;

FIGS. 9-13 are plan views showing various configurations assumable by the device of the invention by varying the spacing of the two rings and rotating the outer sets of loops to a desired orientation, which configurations show various shapes of the planets.

DETAILED DESCRIPTION OF THE INVENTION

Figure 1:
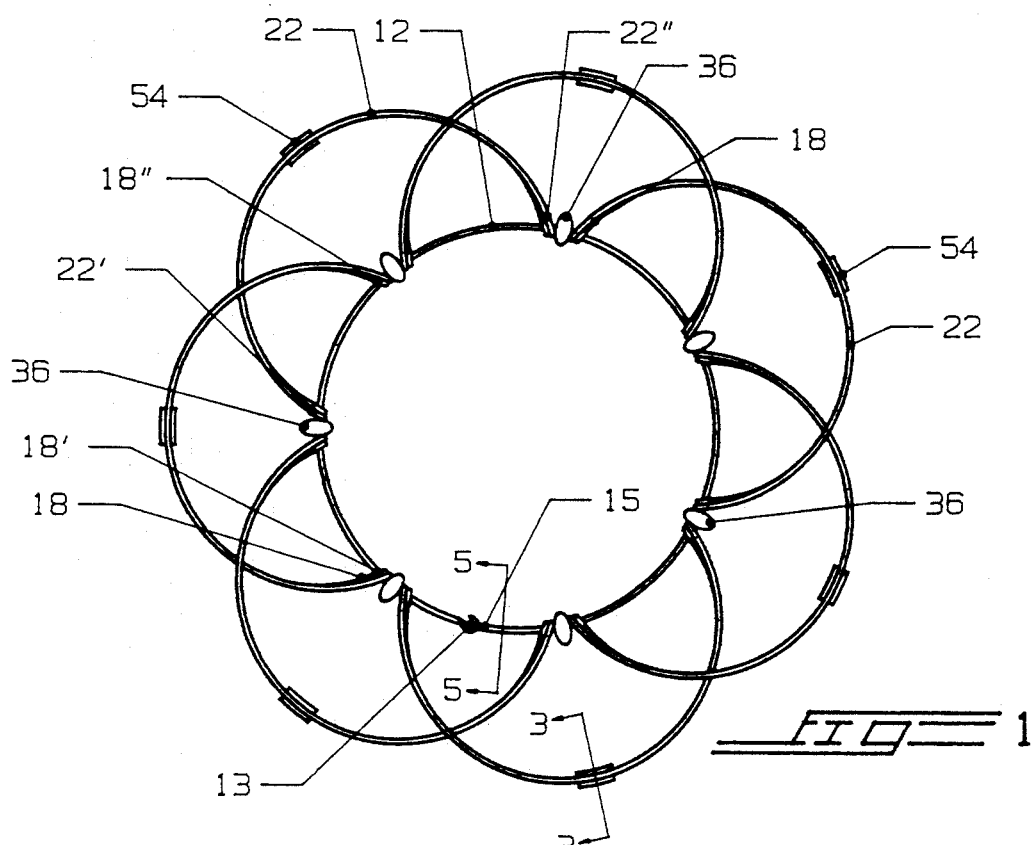
FIG. 1 is a front, plan view of the educational device of the invention with the two rings thereof brought into closest contact with each other and the loops of the rings rotated to upper positions.

Referring now to the drawings in greater detail, and to FIGS. 1-8 for now, the device of the invention is indicated generally by reference numeral 10. The device 10, in the preferred embodiment, includes two circular rings 12, 14 that are spaced apart and parallel to each other. The rings 12, 14 are interconnected by mutually-pivotal semicircular loop portions, as described below in detail. Each circular ring is formed of spring steel, or the like, and in the preferred embodiment is formed into a closed loop by mating hooks 13, 15 at its ends.

Figure 2:
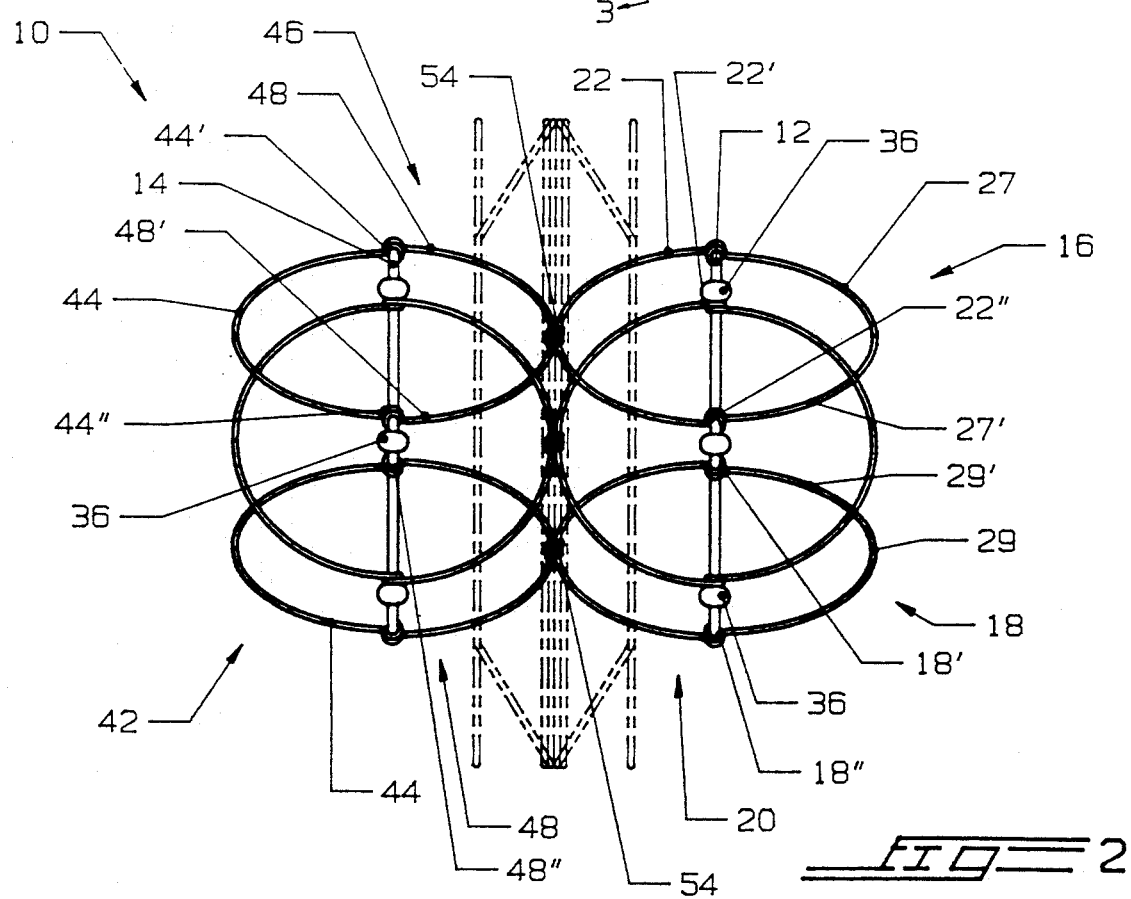
FIG. 2 is a side view thereof with the rings thereof spaced apart and the loops of the rings rotated to intermediate positions.

The ring 12 is provided with two sets of pivotally-mounted semicircular loop-portions: A first, exterior set 16 comprising, in the preferred embodiment, seven semicircular loop-portions 18; and a second, inner or interior set 20 also comprising seven semicircular loop-portions 22. The loop or ring-portions 18 of the first set 16 overlap each other, and are intertwined, such that a first end-portion of each loop-portion overlaps on the interior-facing side an adjacent loop-portion, with its second end-portion overlapping on the exterior-facing side of the other adjacent loop-portion, as best seen in FIG. 2. The loop-portions of the second set 20 are similarly arranged. Each loop-portion, or half-loop, 18 or 22 is made of spring metal, and each defines a first hook-end 18', 22', respectively, and a second hook-end 18'', 22'', respectively, which hook-ends receive therethrough a portion of the ring 12. These hook-ends allow for each half-loop, or half-ring, to be rotated in either the clockwise or counterclockwise directions. Since the second, interior set 20 of half-loops 22 are pivotally interconnected with a similar set of half-loops associated with the other circular ring 14, as described below in greater detail, the rotation of the half-loops 22, and their relative orientations, are determined by the spacing between the two circular rings 12, 14. The first, exterior set 16 of half-loops 18 is free to rotate relatively independently of the spacing of the rings 12, 14, with the only limitation to the counterclockwise rotation of the half-loops 18, when viewing FIG. 2, being the half-loops 22 of the second, interior set 20, the positions of which half-loops 22 are, however, determined by the spacing between the rings 12, 14. Thus, for a close spacing of the rings 12, 14, the counterclockwise rotation of the half-loops 18 would be less than for a more distant spacing thereof, where the half-loops 22 would be in a more downwardly-pivoted orientation with respect to the plane containing the ring 12. Rotation of the half-loops 18 in the clockwise direction, when viewing FIG. 2, is limited by the abutment of one end-portion of each half-loop against an oppositely-disposed end-portion of another half-loop second therefrom in each respective direction, which another half-loop is not overlapping with the one end portion thereof. In FIG. 2, for example, this would be the half-loops 27 and 29, so that when the half-loops are rotated downwardly in the clockwise direction, when viewing FIG. 2, the end portion 27' of the half-loop 27 would abut against the end portion 29' of the half-loop 29, to thereby prevent further rotation. The same principal would hold for other pairs of half-loops 18.

Each half-loop 18 of the first set 16 and its corresponding, juxtapositioned half-loop 22 of the second set 20 span approximately the same arcuate length of the ring 12. The hook-ends 22', 22" of each respective half-loop 22 are connected to the ring 12 directly adjacent to the hook-ends 18"', 18" of the corresponding juxtapositioned half-loop 18. The hook-ends 22', 22" sandwich therebetween the hook-ends 18',18" of the respective half-loop 18 juxtapositioned thereat, which spans approximately the same arcuate length of the ring 12. A plurality of smooth-surfaced beads 36 are spaced about the circumference of the ring 12, with each bead separating a pair of hook-ends 18',22' of a first pair of juxtapositioned half-loops 18, 22 from an adjacent pair of hook-ends 18",22" of another pair of juxtapositioned half-loops 18, 22, which half-loops of the other pair do not overlap with the first pair of half-loops. There are seven such beads 36 in the preferred embodiment, where there are seven half-loops provided for each set 16 and 20. The beads 36 prevent the hook-ends from abutting against each other, which would make rotation of the half-loops more difficult, and also serves a decorative effect. Each bead 36 is slidably mounted on the ring 12, with the springiness of the spring-steel of the half-loops causing the hook-ends thereof into contact with the respective beads 36. Each bead lies approximately at the center of radius of a pair of mutual, juxtapositioned half-loops 18, 22, as seen in FIG. 7, which center bead abuts against hook-ends of the half-loops overlapping with the pair of mutual, juxtapositioned half-loops of which it is at its center of radius. In the preferred embodiment, each half-loop 22 of the second set 20 has a slightly greater radius of curvature than each half-loop 18 of the first exterior set 16.

Associated with the second circular ring 14 are a first, exterior set 42 of half-loops 44, and a second, interior set 46 of half-loops 48. The first set 42 is identical to the first set 16 of the ring 12, and the second set 46 is identical to the second set 20 of the ring 12. The ring 14 also has a plurality of beads 36 for spacing the hook-ends 44',44", 48', 48", as in the ring 12. The construction and arrangement of the first and second sets 42, 46 and the ring 14 is identical to that of the first ring 12, and its first and second sets, so that any further description is unnecessary.

The half-loops of the two inner, second sets 20 and 46 are pivotally coupled to each other, with each half-loop 22 of the second set 20 associated with the first ring 12 being pivotally coupled to its counterpart half-loop 48 of the second set 46 associated with the second ring 14. This pivotal coupling is achieved by seven hollow coil-elements 54, one such coil-element for each mutual pair of half-loops 22,48. Each coil-element 54 receives through its hollow interior juxtapositioned portions of the mutual pair of half-loops 22,48, as best seen in FIGS. 3 and 4. The coil-elements are also preferably made of spring steel, and allow the necessary degree of freedom of movement of the portions of the half-loops passing therethrough, in order to accommodate all spacings of the two rings 12 and 14, with the concomitant different pivotal orientations of the inner half-loops 22, 48 associated with the different spacings between the rings 12, 14, as may be seen, for example, in FIG. 2, when the rings 12, 14 are far apart, with the inner half-loops 22, 48 assuming a more horizontal orientation, as compared to the dotted-line showing in FIG. 2, where the rings are more closely spaced, where the inner half-loops 22, 48 are much more vertically oriented, with the coil-elements allowing for the proper degree of freedom of movement in the rotational directions, as well as in the linear direction taken along a line parallel to the line connecting the centers of the circular rings 12, 14, and the linear direction taken along a perpendicular to the line of centers.

Figure 10:
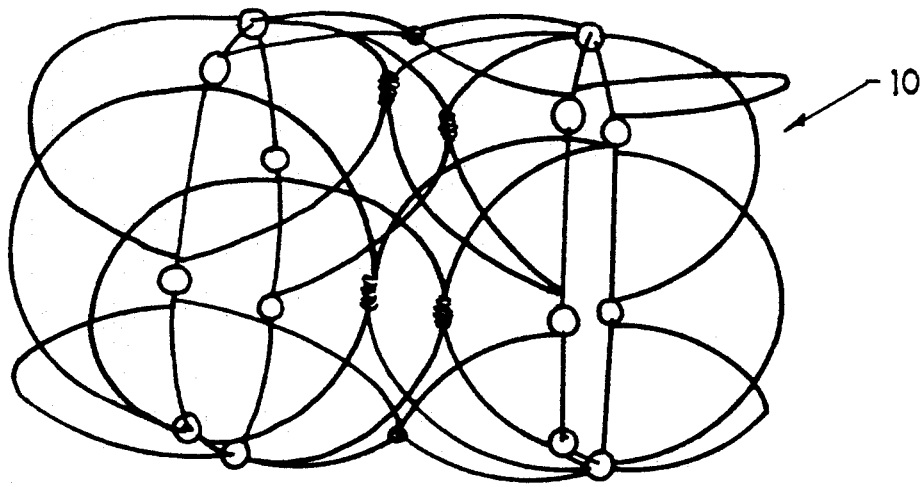
Figure 11:
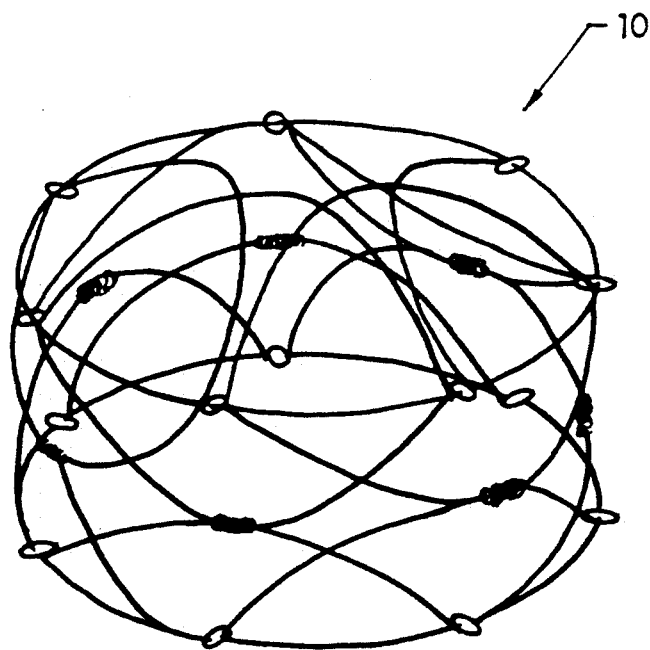
Figure 12:
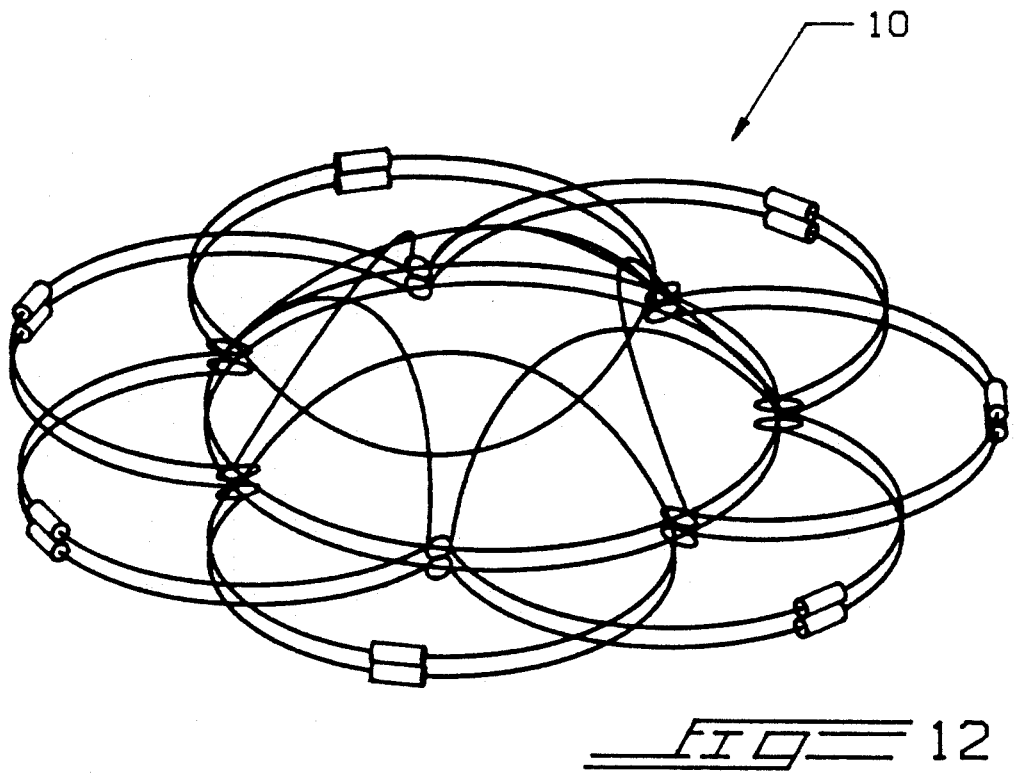
Figure 13:
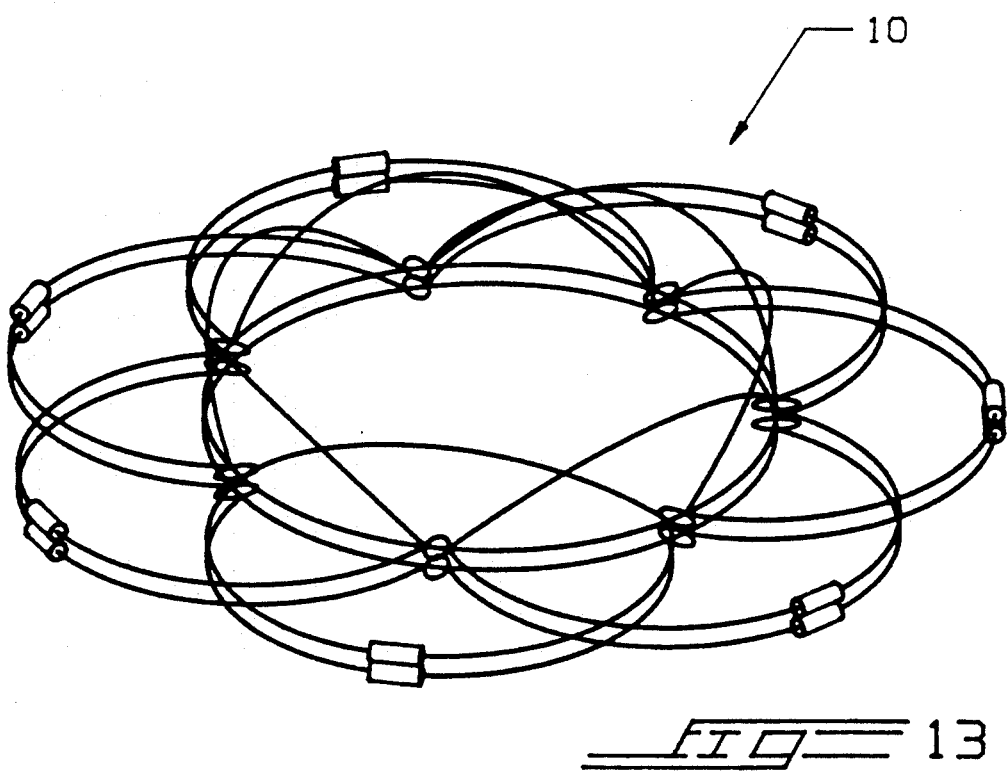

As mentioned above, the device 10 may assume a variety of different shapes by changing the spacing between the circular rings 12, 14, and by rotating the outer half-loops associated with each ring to a desired orientation. Thus, the device 10, in addition to other uses and functions, is ideally suited for displaying the shapes of the planets, whether it be elliptical, oblong, or the like. FIGS. 9-13 show different configurations assumable by the device 10. FIGS. 9 and 12 show the planet Saturn, which has rings about it. This configuration is achieved by bringing the two rings 12, 14 close together and pivoting the exterior half-loops 22, 48 in the downward direction to form an oval-like object, with the inner half-loops 18, 44 being oriented vertically to define the rings about the planet Saturn. FIG. 10 shows the planet Neptune, which is an elongated orb. This configuration is achieved by spacing the rings 12 and 14 a maximum distance apart, where the inner half-loops 18, 44 are approximately horizontal, and rotating the outer half-loops 22, 48 until they, too, are approximately horizontal. FIG. 11 depicts the shape of the planet Mars, which is an oval-shaped orb. This is achieved by spacing the rings 12, 14 a maximum distance apart and rotating the exterior half-loops 22, 48 downwardly to their limit movement. FIG. 13 depicts the planet Venus. Of course, these configurations are shown only by way of example. The device 10 may be used to form a design not necessarily associated with a shape of a planet or a planet with satellites, but may be used to form a design of one's own imagination. The device 10 is also ideally suited for a bracelet, where the design of the bracelet itself may be altered even as one is wearing it about the wrist. The device 10 may be used a stand-alone sculpture, with the first exterior set 16 being oriented to be coplanar with the ring 12, in order to serve as a support base. Thereafter, the rings 12, 14 may be spaced apart a desired distance to obtain a desired orientation of the inner half-loops 18, 44. The outer half-loops 48 may then be rotated to a desired orientation in order to arrive at the aesthetic appearance desired.

It is to be understood that other materials may be used besides those described above. The number of half-rings used per set may also vary, and the ring and half-ring need not be perfectly circular in arcuate extent.

While a specific embodiment of the invention has been shown and described, it is to be understood that numerous changes and modifications may be made therein without departing from the scope, spirit and intent of the invention as set forth in the appended claims.

What I claim is:

1. A device capable of assuming different, stable configurations, comprising:
   a first ring member;

a second ring member coupled to, and spaced from, said first ring member;

a first, exterior set of a plurality of exterior half-loop members rotatably mounted to said first ring member;

a second interior set of a plurality of interior half-loop members also rotatably mounted to said first ring member;

a third, exterior set of a plurality of exterior half-loop members rotatably mounted to said second ring member;

a fourth interior set of a plurality of interior half-loop members rotatably mounted to said second ring member; and means coupled to said interior half-loop members of said second set and to said interior half-loop members of said fourth set for providing at least relative rotational movement between said interior half-loop members.

2. The device according to claim 1, wherein each of said first, second, third, and fourth sets comprises seven said half-loop members.

3. The device according to claim 1, wherein said half-loops of each said first, second, third, and fourth sets overlap with at least two other said half-loop members of the same respective said set.

4. The device according to claim 3, wherein each said half-loop member of each said set comprises a first end rotatably mounted to a portion of the respective said ring, and a second end rotatably mounted to another portion of the respective said ring.

5. The device according to claim 4, wherein each said set comprises the same number of said half-loop members; said half-loop members of said first set being arranged about said first ring approximately in the same way as said half-loop members of said second set, to define a plurality of mutual pairs of half-loop members, one said half-loop member of each said pair being from said first set, and the other of each said pair being from said second set, said half-loop members of each said pair approximately spanning the same arcuate distance along said first ring.

6. The device according to claim 5, wherein said half-loop members of said third set being arranged about said second ring approximately in the same way as said half-loop members of said fourth set, to define a plurality of mutual pairs of half-loop members, one said half-loop member of each said pair being from said third set, and the other of each said pair being from said fourth set, said half-loop members of each said pair approximately spanning the same arcuate distance along said second ring.

7. The device according to claim 6, wherein said means coupled to said interior half-loop members of said second set and to said interior half-loop members of said fourth set for providing at least relative rotational movement between said interior half-loop members comprises a plurality of hollow members receiving therethrough portions of said interior half-loop members from said second and fourth sets; one said hollow member for one pair of mutual adjoining interior half-loop members of said second and fourth sets, each said pair of mutual adjoining interior half-loop members having one half-loop member from said second set, and the other half-loop member from said fourth set.

8. The device according to claim 6, wherein each of said first and second rings comprises a plurality of beads; each said bead lying approximately midway between the first and second ends of said half-loops of a respective said mutual pair of half-loop members from said first set and said second set.

9. The device according to claim 8, wherein each said bead separates between said first ends of a respective said pair of half-loop members and said second ends of another said pair of half-loop members.

10. The device according to claim 6, wherein each said interior half-loop has a slightly larger radius of curvature than each said exterior loop.

11. The device according to claim 1, wherein each said half-loop of each said set comprises a first hook-end receiving therethrough a portion of a respective said ring, and a second hook-end receiving therethrough another portion of the respective said ring.

12. A device capable of assuming different, stable configurations, comprising:

at least one ring member;

a first, exterior set of a plurality of exterior half-loop members rotatably mounted to said at least one ring member;

a second interior set of a plurality of interior half-loop members also rotatably mounted to said at least one ring member;

said half-loops of each of said first and second sets overlapping with at least two other said half-loop members of the same respective said set;

each said half-loop member of each said set comprising a first end rotatably mounted to a portion of said ring, and a second end rotatably mounted to another portion of said ring.

13. The device according to claim 12, wherein each said set comprises the same number of said half-loop members; said half-loop members of said first set being arranged about said ring approximately in the same way as said half-loop members of said second set, to define a plurality of mutual pairs of half-loop members, one said half-loop member of each said pair being from said first set, and the other of each said pair being from said second set, said half-loop members of each said pair approximately spanning the same arcuate distance along said ring.

14. The device according to claim 13, wherein each said half-loop of each said set comprises a first hook-end receiving therethrough a portion of said ring, and a second hook-end receiving therethrough another portion of said ring.

15. The device according to claim 14, wherein said ring comprises a plurality of beads; each said bead lying approximately midway between the first and second ends of said half-loops of a respective said mutual pair of half-loop members from said first set and said second set.

16. The device according to claim 15, wherein each said bead separates between said first ends of a respective said pair of half-loop members and said second ends of another said pair of half-loop members.

* * * * *